(12) United States Patent
Serrarens

(10) Patent No.: US 8,347,748 B2
(45) Date of Patent: Jan. 8, 2013

(54) GEAR CHANGING DEVICE FOR AUTOMOTIVE APPLICATIONS

(75) Inventor: Alexander Franciscus Anita Serrarens, JS Waalre (NL)

(73) Assignee: Innovius B.V., Eindhoven (NL)

(*) Notice: Subject to any disclaimer, the term of this patent is extended or adjusted under 35 U.S.C. 154(b) by 1147 days.

(21) Appl. No.: 12/158,329

(22) PCT Filed: Dec. 22, 2006

(86) PCT No.: PCT/NL2006/000665
§ 371 (c)(1), (2), (4) Date: Aug. 18, 2008

(87) PCT Pub. No.: WO2007/073181
PCT Pub. Date: Jun. 28, 2007

(65) Prior Publication Data
US 2008/0307917 A1    Dec. 18, 2008

(30) Foreign Application Priority Data
Dec. 23, 2005  (NL) ..................... 1030762

(51) Int. Cl.
*B60K 20/02* (2006.01)

(52) U.S. Cl. ....................... 74/335; 74/473.3

(58) Field of Classification Search .............. 74/335, 74/473.3, 473.32, 473.33
See application file for complete search history.

(56) References Cited

U.S. PATENT DOCUMENTS

| | | | |
|---|---|---|---|
| 7,174,801 B2 * | 2/2007 | Ogasawara et al. | 74/473.3 |
| 2004/0016314 A1 * | 1/2004 | Satoh et al. | 74/473.3 |
| 2004/0123693 A1 * | 7/2004 | Ogasawara et al. | 74/473.1 |
| 2005/0257637 A1 * | 11/2005 | Osamura et al. | 74/473.1 |
| 2006/0185461 A1 * | 8/2006 | Kino | 74/473.3 |

FOREIGN PATENT DOCUMENTS

| | | |
|---|---|---|
| WO | WO03/085481 | 10/2003 |
| WO | WO2007/073181 | 6/2007 |

* cited by examiner

*Primary Examiner* — Ha D. Ho

(57) ABSTRACT

A gear changing device (1) has a gear lever (3) to operate a vehicle gear box, and several sensors to detect the movement of the gear lever with respect to the surroundings as a result of a force exerted by a user on the gear lever. The gear-changing device also has two electrical motors (5, 7), which are connected to the gear lever (3) via transmissions (9, 11). The transmission (9, 11) are formed by self-braking worm-worm wheel transmissions. The gear lever (3) can only be shifted if the electrical motors are actuated. The electrical motors shift the gear lever or permit the movement of the gear lever, depending on the sensor signals. The movement speed of the gear lever in this is such that it appears to the user that he has to overcome resistance to be able to shift the gear lever, so that the gear lever exercises a haptic effect.

12 Claims, 3 Drawing Sheets

GEAR CHANGING DEVICE FOR AUTOMOTIVE APPLICATIONS

BACKGROUND OF THE INVENTION

1. Field of the Invention

The invention relates to a gear changing device for automotive applications comprising: a gear lever, at least one sensor to detect a movement of and/or force exerted on the gear lever, which sensor emits a sensor signal, depending on the movement of and/or force on the gear lever, and at least one actuator that is connected to the gear lever via a transmission.

2. Prior Art

Such a gear changing device is known from WO 03085481 A. This well-known gear changing device has two sensors and two actuators, which are connected via a toothed belt transmission to two revolving shafts, which are connected to the gear lever via a gimbal mechanism. Forces are exerted on the gear lever when it is shifted by the actuators, which forces resist the movement of the gear lever in a direction deviating from a prior determined movement pattern and which also exert counter-forces on the gear lever in the permitted movement direction so that the user experiences a haptic feeling.

In order to prevent this well-known gear changing device from causing the gear lever to slip out of a pre-set position accidentally, the actuators must also be actuated if the gear lever is not shifted, in order to exert forces on the gear lever, which keep the gear lever in the set position.

SUMMARY OF THE INVENTION

An objective of the invention is to provide a gear changing device of the sort described in the preamble in which it is not necessary to actuate the actuators in order to keep the gear lever in position. For this purpose the gear changing device according to the invention is characterised in that the transmission is self-braking and, depending on the sensor signal, the actuator shifts the gear lever and/or permits the movement of the gear lever. The actuator is used therefore to shift or to allow the user to shift the gear lever, which a user without the assistance of the actuator can only shift to a limited extent due to the self-braking nature of the transmission. The gear lever cannot slip accidentally with a self-braking transmission between the actuators and the gear lever. The gear lever can only be shifted if the actuator is actuated, which occurs after a force is exerted on the gear lever so that it can make a limited movement.

An embodiment of the gear changing device according to the invention is characterised in that the transmission is a worm-worn wheel transmission. A worm-worm wheel transmission is a very suitable self-braking transmission for this application.

A further embodiment of the gear changing device according to the invention is characterised in that the gear changing device when used in a vehicle is connected to the surroundings formed by the rest of the vehicle, and the sensor detects the movement of the gear changing device with respect to the surroundings as a result of a force exerted by a user on the gear level. The detection of the movement of the gear changing device is also here defined as the detection of the speed (shift per time unit) of the gear changing device.

Preferably, the gear changing device comprises at least one flexible element, with which the gear changing device when used in a vehicle is connected to the surroundings formed by the rest of the vehicle, so that the movement of the gear changing device with respect to the surroundings is the result of elastic distortion of the flexible element due to the force exerted by a user on the gear lever. The gear changing device is preferably connected to the surroundings via at least two flexible elements in order to manipulate the gear lever in a horizontal plane.

Moreover, the gear changing device, to be able to manipulate the gear lever in a horizontal plane, preferably comprises a further sensor to detect a movement of and/or force exerted on the gear lever in a direction at right angles to that which is detected by the other sensor, as well as a further actuator that is connected via a further transmission to the gear lever and which, depending on the sensor signal, shifts the gear lever and/or permits the movement of the gear lever in a direction at right angles to that of the other actuator.

Still a further embodiment of the gear changing device according to the invention, which makes it possible for the gear lever to make the desired movements, is characterised in that the gear changing device also comprises a carrier on which the gear lever is present, as well as a frame that, pivoted around a first shaft, is connected to the surroundings, in which the carrier, pivoted around a second shaft at right angles to the first shaft, is connected to the frame, and in which the actuator is rigidly connected to the surroundings and is connected to the frame via the transmission.

In a further embodiment of this the further actuator is rigidly connected to the carrier via the further transmission, in which the output shaft of the further transmission is fastened to the frame.

In another embodiment of this the further actuator and the further transmission are fastened to the frame, in which the actuator is connected to the input shaft of the further transmission via an ancillary transmission, and in which the output shaft of the further transmission is fastened to the carrier.

In still another embodiment of this the further actuator is rigidly connected to the surroundings and is present in line with the output shaft of the transmission, in which the further actuator is connected to the input shaft of the further transmission via an ancillary transmission, and in which the output shaft of the further transmission is fastened to the carrier.

Again a further embodiment of the gear changing device according to the invention is characterised in that the worm is connected to the actuator and the worm wheel to the gear lever, and in that the gear changing device comprises first devices to measure the rotation speed of the worm, as well as second devices to measure the power transmitted to the actuator, third devices to search for the rotation speed of the worm that pertains to the measured power with an idle gear lever, and a control unit which controls the speed of the actuator, depending on the difference between the measured rotation speed and the rotation speed deduced from the measured power. This makes it possible to adapt the speed at which the actuator shifts the gear lever or the speed of the gear lever that is permitted by the actuator to the speed at which the user desires to shift the gear lever. If the user wishes to shift the gear lever quickly, he will exert a greater force than if he wishes to shift the gear lever only slowly. This force is exerted via the worm wheel against the worm, so that it has to overcome a greater frictional force. This means that the worm will rotate more slowly if the power transmitted to the actuator remains the same. This will be detected, after which the control unit can shift the gear lever more quickly by transmitting more power to the actuator.

To detect in which direction a user wishes to shift the gear lever, the direction of the force exerted on the gear lever can be determined by using a pressure sensor, which detects the force exerted on the gear lever, or by elastically suspending the gear changing device and measuring the elastic distortions of the suspension.

To create a safeguard against overload of the gear lever whereby the sensor could be damaged, a still further embodiment of the gear changing device according to the invention is characterised in that the gear lever is moveably connected to an ancillary frame at a distance from an end and on this end is provided with a ball that has a spring connection to the gear lever in the axial direction of the gear lever, which ancillary frame is also connected to an element provided with a notch, so that the ball is present in the notch and pressure sensors are present between the element and the ancillary frame. If a force is exerted on the gear lever which is larger than a set maximum value, the ball pops out of the notch. The value of the maximum permissible force can be set by increasing or decreasing the spring force with which the ball is pressed into the notch.

The notch is preferably cup-shaped and present in the middle of a plane. If the ball pops out of the notch, it is pressed back against the plane by the spring. By then moving the gear lever the ball can be brought back into the notch so that the old situation is restored. There is preferably a further pressure sensor under the notch, which detects the presence of the ball in the notch.

The connection between the gear lever and the ancillary frame can for example be formed by a construction in which the gear lever is pivoted with bearings around a first shaft in an attachment that is pivoted on bearings around a second shaft, which is pivoted on bearings in the ancillary frame at right angles to the first shaft. The spring force can for example be set by moving the element in the lengthwise direction of the gear lever. This for example can be taken up by the pressure sensors in a holder, which is fastened to the ancillary frame via elongated holes.

Any suitable, well-known sensor can be used, for example a potentiometer, a rotation encoder, an optical encoder with a single or double laser beam, a magnetic or capacitive encoder, etc.

BRIEF DESCRIPTION OF THE DRAWINGS

The invention will be elucidated more fully below on the basis of drawings in which embodiments of the gear changing device according to the invention are shown. In these drawings.

DETAILED DESCRIPTION OF THE DRAWINGS

Figure 1:
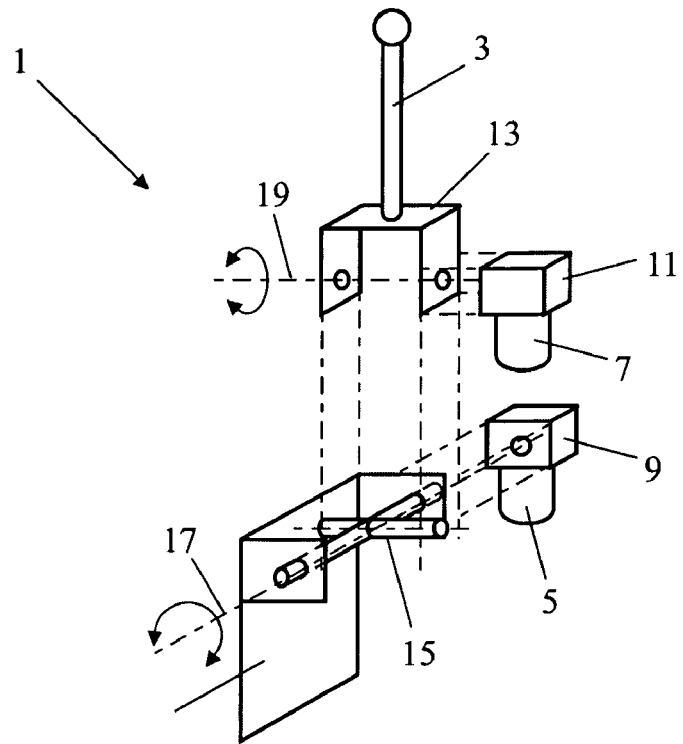
FIG. 1 shows a first embodiment of the gear changing device according to the invention.

FIG. 1 shows a first embodiment of the gear changing device according to the invention. The gear changing device is connected via an assembly frame 2 to the surroundings formed by the rest of the vehicle when the gear changing device 1 is used in a vehicle. The gear changing device 1 has a gear lever 3, which for example is used to operate the vehicle gear box. The gear changing device also has several sensors (not shown) to detect the movement of the gear lever with respect to the surroundings as a result of a force exerted by a user on the gear lever. The gear changing device is connected via flexible elements (not shown) to the surroundings. If the user exerts a force on the gear lever 3, these flexible elements will distort elastically, so that the sensors detect the movement of the gear lever or distortion of the elastic elements. Any suitable, well-known sensor can be used, for example a potentiometer, a rotation encoder, an optical encoder with a single or double laser beam, a magnetic or capacitive encoder, etc.

The gear changing device also has two actuators that, in this and all embodiments described below, are formed by electrical motors 5, 7 and which are connected to the gear lever 3 via transmissions 9, 11. The transmissions 9, 11 are formed by worm-worm wheel transmissions that are self-braking. The gear lever cannot shift accidentally because of a self-braking transmission between the actuators and the gear lever. The gear lever can only be shifted if the actuators are actuated. The electrical motors shift the gear lever or permit the movement of the gear lever, depending on the sensor signals. For this purpose the gear changing device 1 comprises a processor (not shown), which is able to receive the sensor signals from the sensors and to process them into control signals for the actuators, so that the gear lever can be shifted in the indicated direction by the exertion of a force on the gear lever by the user, taking into consideration the freedom of movement permitted to the gear lever that was entered into the processor beforehand. The movement speed of the gear lever is by this such that it appears to the user that he has to overcome resistance in order to shift the gear lever, so that the gear lever exercises a haptic effect, which mainly limits the freedom of movement of the gear lever to a prior determined pattern.

The gear changing device 1 also has a carrier 13 on which the gear lever 3 is fastened, and a frame 15 that, pivoted around a first shaft 17, is connected to the assembly frame 2. The carrier 13 is formed by a U-shaped brace and the frame 15 is formed by four shaft ends fastened together in the shape of a cross. The carrier 13 is pivoted to the frame 15 and is thus pivoted around a second shaft 19, which is at right angles to the first shaft 17. The electrical motor 5 is rigidly connected to the assembly frame 2 via the housing of the transmission 9, in which the output shaft of the electrical motor is connected via the transmission 9 to one of the shaft ends of the frame 15. The further electrical motor 7 is rigidly connected to the carrier 13 via the housing of the further transmission 11, in which the output shaft of the electrical motor 7 is connected via the further transmission 11 to one of the shaft ends of the frame 15.

Figure 2:
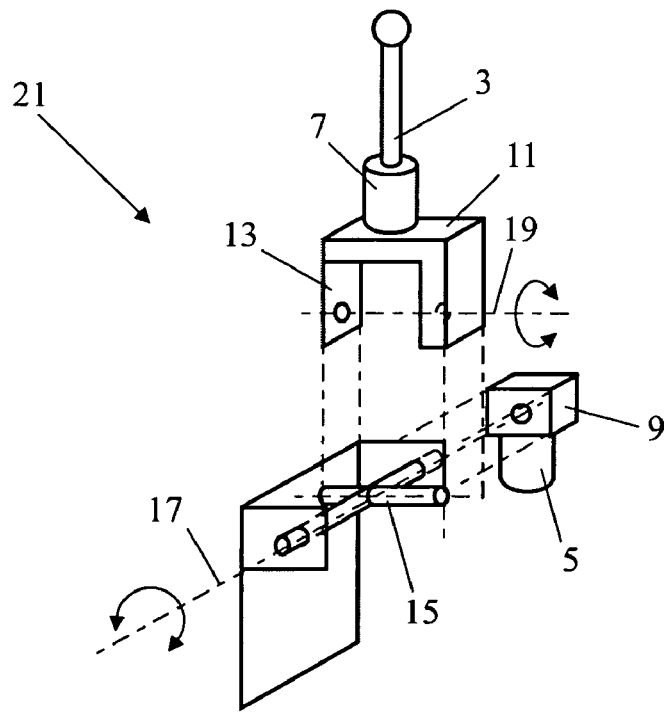
FIG. 2 shows a variant of the gear changing device shown in FIG. 1.

FIG. 2 shows a variant of the gear changing device shown in FIG. 1. All parts that are equal to those of the first embodiment are designated by the same reference numbers. In this gear changing device 21 the further transmission 11 is formed by two right-angled transmissions, and the further electrical motor 7 is fastened to the gear lever 3. This provides a more compact construction than the first embodiment.

Figure 3:
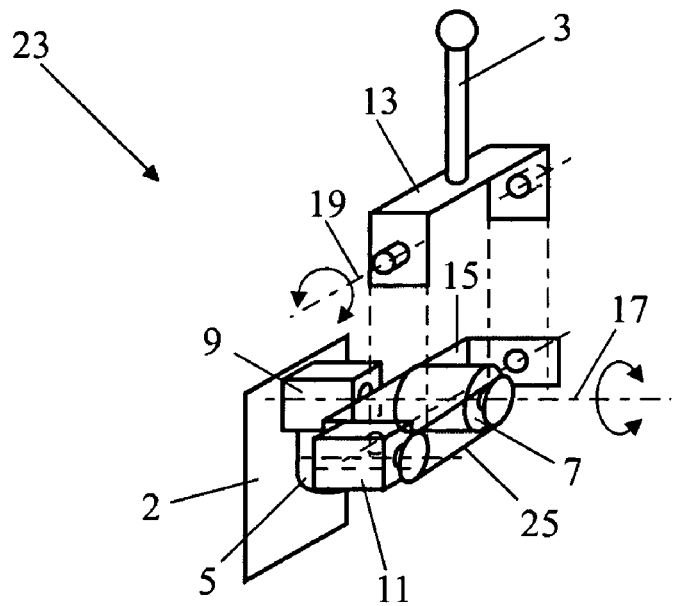
FIG. 3 shows a second embodiment of the gear changing device according to the invention.

FIG. 3 shows a second embodiment of the gear changing device according to the invention. All parts that are equal to those of the first embodiment are designated by the same reference numbers in this case as well. In this gear changing device 23 the further electrical motor 7 and the further transmission 11 are fastened to the frame 15. The frame 15 is here also formed by a U-shaped brace. The output shaft of the electrical motor 7 is connected via an ancillary transmission 25, formed by a belt transmission, to the input shaft of the further transmission 11, in which the output shaft of the further transmission 11 is fastened to the carrier 13.

Figure 4:
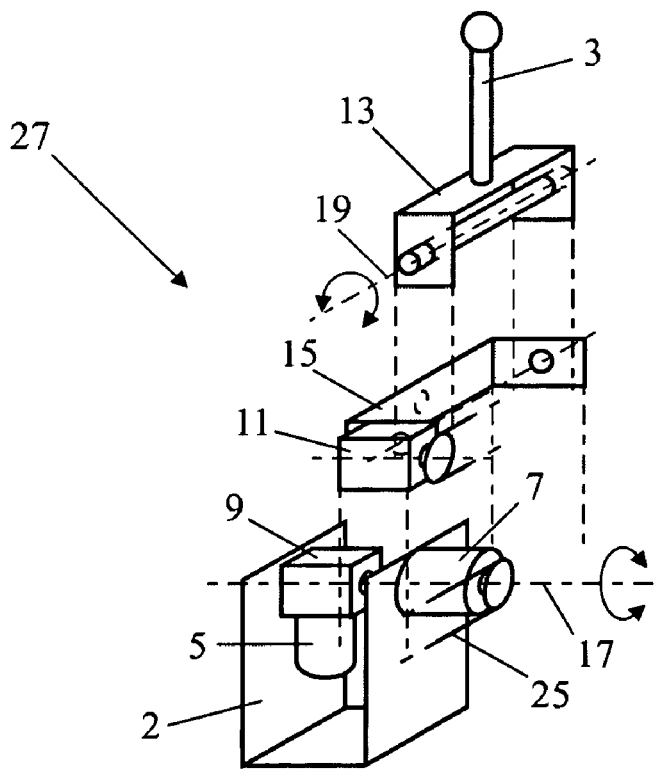
FIG. 4 shows a variant of the gear changing device shown in FIG. 3.

FIG. 4 shows a variant of the second embodiment of the gear changing device shown in FIG. 3. All parts that are equal to those of the second embodiment are again designated by the same reference numbers. In this gear changing device 27 the further electrical motor 7 is fastened to the assembly frame 2 and is present in line with the output shaft of the transmission 9. The further electrical motor 5 is here again connected via the ancillary gear 25 to the input shaft of the further transmission 11. The output shaft of the further transmission 11 is again fastened to the carrier 13.

In all the above embodiments of the gear changing device the worms of the transmissions 9, 11 are connected to the electrical motors 5, 7 and the worm wheels are connected to the carrier 13 and the frame 15. The gear changing devices also have first devices (not shown) to measure the rotation speed of the worms, as well as second devices (not shown) to measure the powers that are transmitted to the electrical motors. The gear changing devices also have third devices (not shown) to search for which rotation speeds of the worms—with an idle gear lever—pertain to the measured powers, and a control unit (not shown) that controls the rotation speeds of the electrical motors, depending on the difference between the measured rotation speeds and the rotation speeds deduced from the measured powers.

Figure 5:
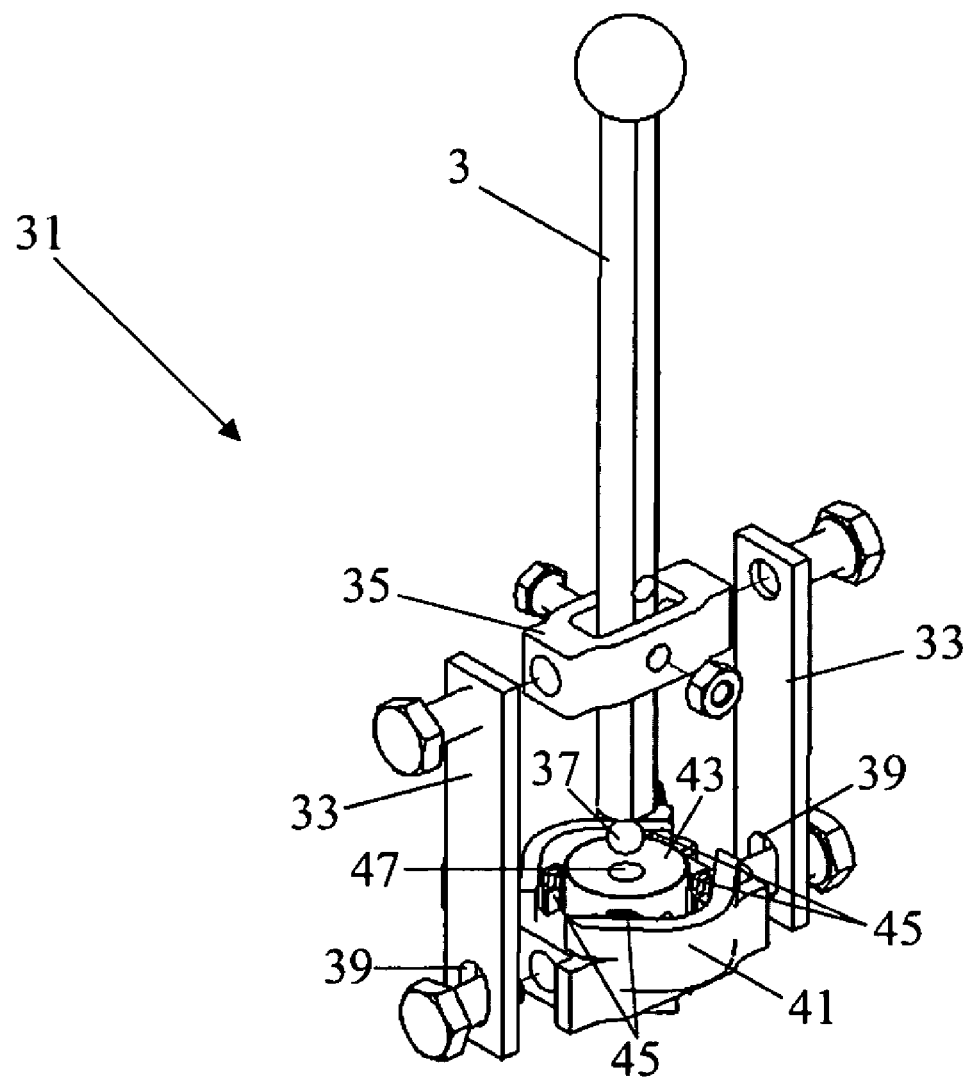
FIG. 5 shows an embodiment of the suspension of the gear lever.

FIG. 5 shows an embodiment of the suspension 31 of the gear lever 3, which provides a safeguard against overload. The gear lever 3 is moveably connected to an ancillary frame that is formed by two strips 33 at a distance from an end. The connection between the gear lever and the ancillary frame is formed by an attachment 35 with which the gear lever 3 is pivoted around a first shaft, which attachment 35, pivoted around a second shaft, is connected to the strips 33.

There is a ball 37 on the end of the gear lever 3, which is fastened to a pin that can be moved in an axial direction in the gear lever against a spring. A holder 41 is connected to the strips 33 via elongated holes 39. An element 43 is present in this holder, in which four pressure sensors 45 are present between this element and the holder. There is a notch 47 in the element in which the ball 37 is found. There is a further pressure sensor (not visible in the figure) at the bottom of the notch 47, which detects the presence of the ball 37 in the notch.

If a force is exerted on the gear lever 3 which is greater than a set maximum value, the ball 37 will pop out of the notch 47. The value of the maximum permissible force can be set by increasing or decreasing the spring force with which the ball is pressed into the notch. This spring force can be set by moving the element 43 in the elongated holes 39.

This suspension of the gear lever 3 can be used in each of the above described embodiments of the gear changing device.

Although in the above the invention is explained on the basis of the drawings, it should be noted that the invention is in no way limited to the embodiments shown in the drawings. The invention also extends to all embodiments deviating from the embodiments shown in the drawings within the context defined by the claims. The flexible elements can for example be omitted and instead play can be introduced into the suspension of the gear changing device on the surroundings to facilitate a small movement of the gear changing device with respect to the surroundings.

The invention claimed is:

1. Gear changing device for automotive applications comprising:
    a gear lever,
    at least one sensor to detect a movement of and/or a force exerted on the gear lever, which sensor emits a sensor signal, depending on the movement of and/or force on the gear lever,
    at least one actuator that is connected to the gear lever via a transmission, and which shifts the gear lever and/or permits the movement of the gear lever depending on the sensor signal
    a further sensor to detect a movement of and/or force exerted on the gear lever in a direction at right angles to that detected by the other sensor, and
    a further actuator that is connected to the gear lever via a further transmission and which shifts the gear lever and/or permits the movement of the gear lever in a direction at right angles to that of the other actuator, depending on the sensor signal,
    wherein the transmission and further transmission are self-braking.

2. Gear changing device according to claim 1, wherein the transmission is a worm-worm wheel transmission.

3. Gear changing device according to claim 1, wherein:
    the gear changing device when used in a vehicle is connected to surroundings formed by the vehicle, and
    the sensor detects the movement of the gear changing device with respect to the surroundings as a result of a force exerted by a user on the gear lever.

4. Gear changing device according to claim 3, wherein the gear changing device comprises at least one flexible element with which the gear changing device when used in the vehicle is connected to the surroundings, in which the movement of the gear changing device with respect to the surroundings is the result of elastic distortion of the flexible element due to the force exerted by the user on the gear lever.

5. Gear changing device according to claim 1, wherein the gear changing device also comprises a carrier on which the gear lever is present, as well as a frame that, pivoted around a first shaft, is connected to the surroundings, in which the carrier, pivoted around a second shaft, is connected to the frame at right angles to the first shaft, and in which the actuator is rigidly connected to the surroundings and is connected to the frame via the transmission.

6. Gear changing device according to claim 1, wherein the further actuator is rigidly connected to the carrier via the further transmission, in which the output shaft of the further transmission is fastened to the frame.

7. Gear changing device according to claim 1, wherein the further actuator and the further transmission are fastened to the frame, in which the actuator is connected to the input shaft of the further transmission via an ancillary transmission, and in which the output shaft of the further transmission is fastened to the carrier.

8. Gear changing device according to claim 1, wherein the further actuator is rigidly connected to the surroundings and is present in line with the output shaft of the transmission, in which the further actuator is connected via an ancillary transmission to the input shaft of the further transmission, and in which the output shaft of the further transmission is fastened to the carrier.

9. Gear changing device according to claim 1, wherein the gear lever has a moveable connection to an ancillary frame at a distance from an end and is provided with a ball on this end, which has a spring connection in an axial direction of the gear lever to the gear lever, to which ancillary frame an element provided with a notch is also connected, in which the ball is present in the notch and pressure sensors are present between the element and the ancillary frame.

10. Gear changing device for automotive applications comprising:
a gear lever;
at least one sensor to detect a movement of and/or a force exerted on the gear lever, which sensor emits a sensor signal, depending on the movement of and/or force on the gear lever;
at least one actuator that is connected to the gear lever via a worm-worm wheel transmission having a worm and a worm wheel, and which shifts the gear lever and/or permits the movement of the gear lever depending on the sensor signal;
wherein the worm is connected to the actuator, and the worm wheel is connected to the gear lever; and
wherein the gear changing device comprises:
first devices to measure the rotation speed of the worm;
second devices to measure the power that is transmitted to the actuator;
third devices to search for which rotation speed of the worm pertains to the measured power with an idle gear lever; and
a control unit that controls the speed of the actuator, depending on the difference in measured rotation speed and the measured power deduced from the rotation speed.

11. Gear changing device according to claim 10, wherein the sensor is a pressure sensor that detects the force exerted on the gear lever.

12. Gear changing device according to claim 10, wherein the gear lever has a moveable connection to an ancillary frame at a distance from an end and is provided with a ball on this end, which has a spring connection in an axial direction of the gear lever to the gear lever, to which ancillary frame an element provided with a notch is also connected, in which the ball is present in the notch and pressure sensors are present between the element and the ancillary frame.

* * * * *